Patented Feb. 3, 1953

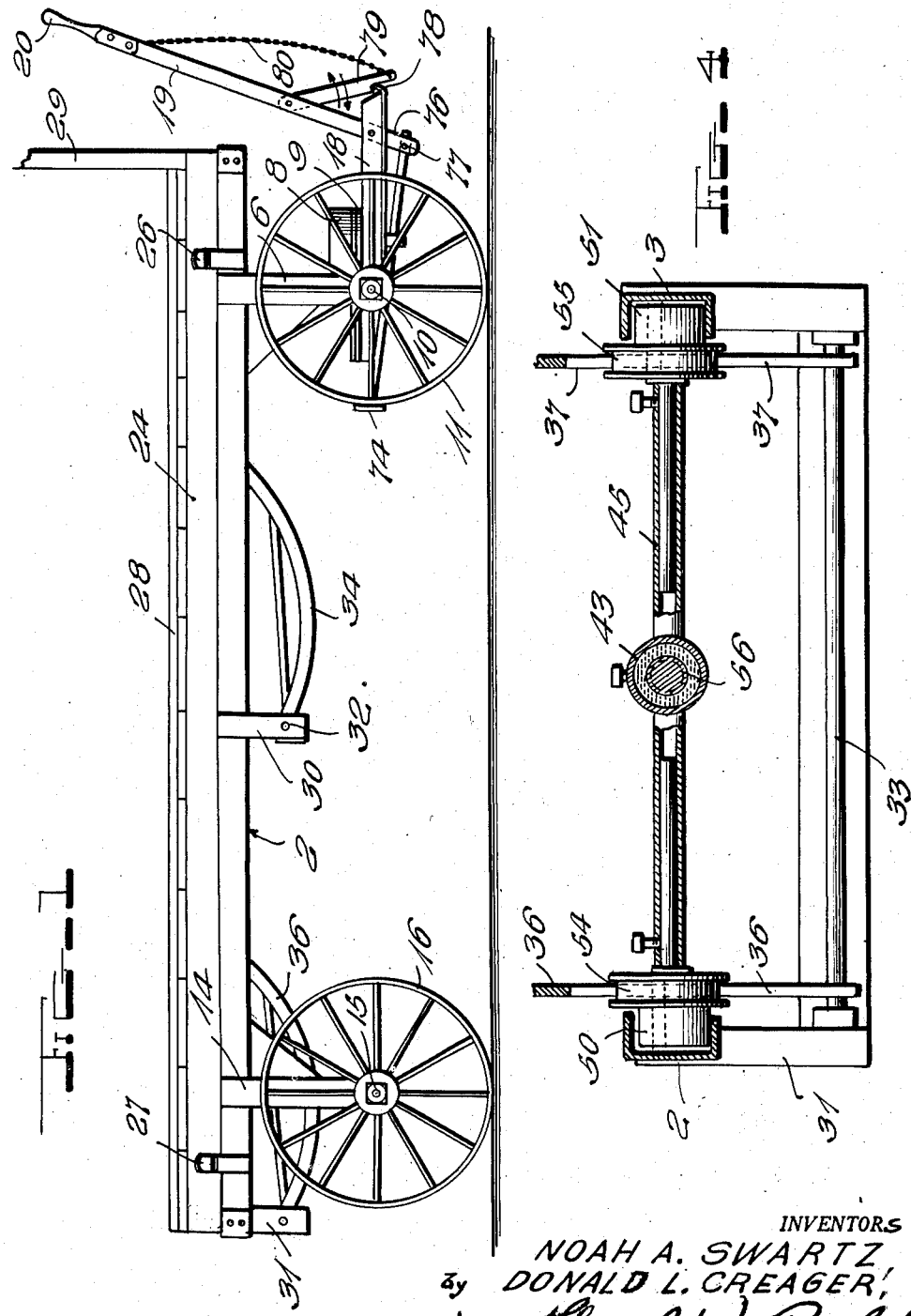

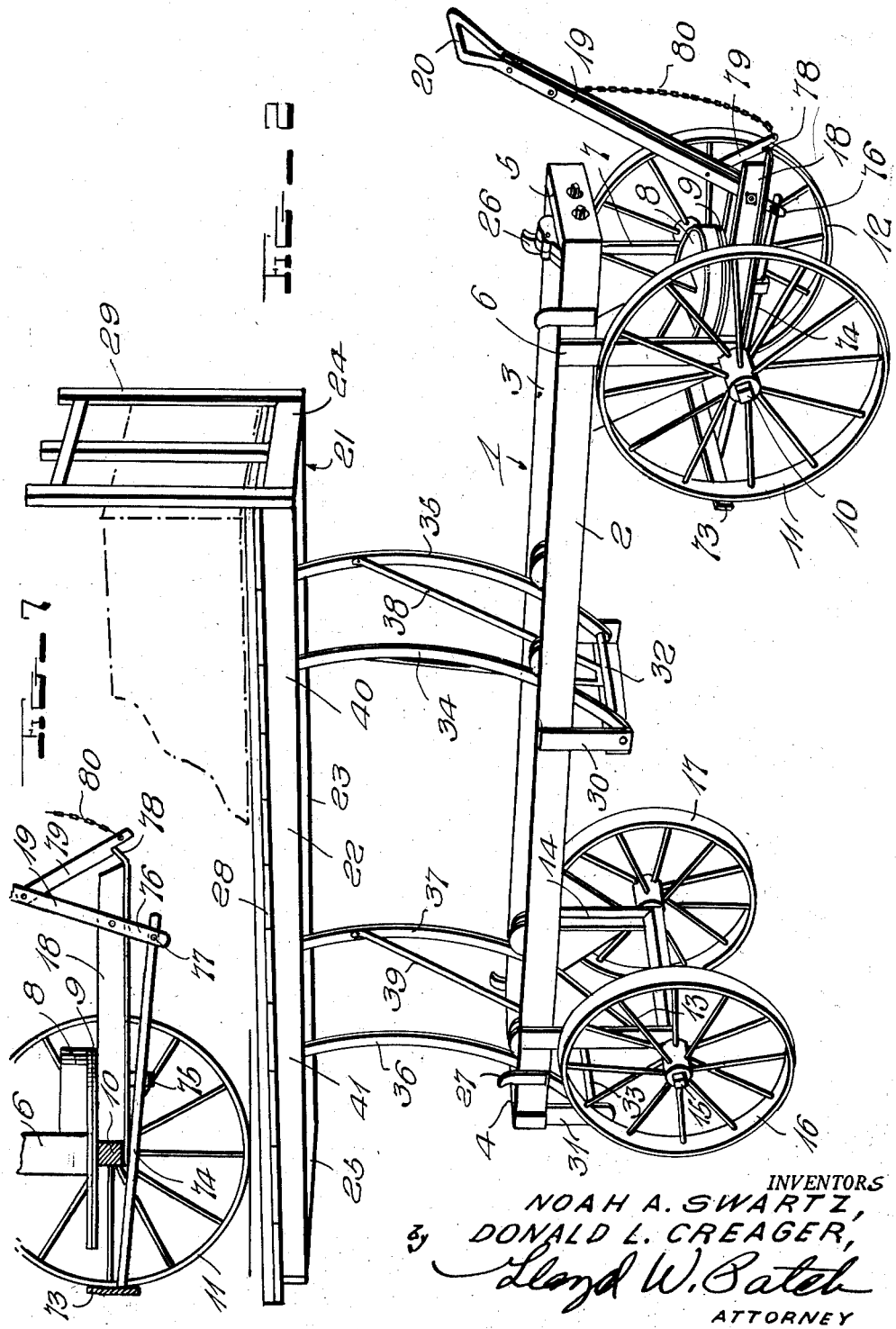

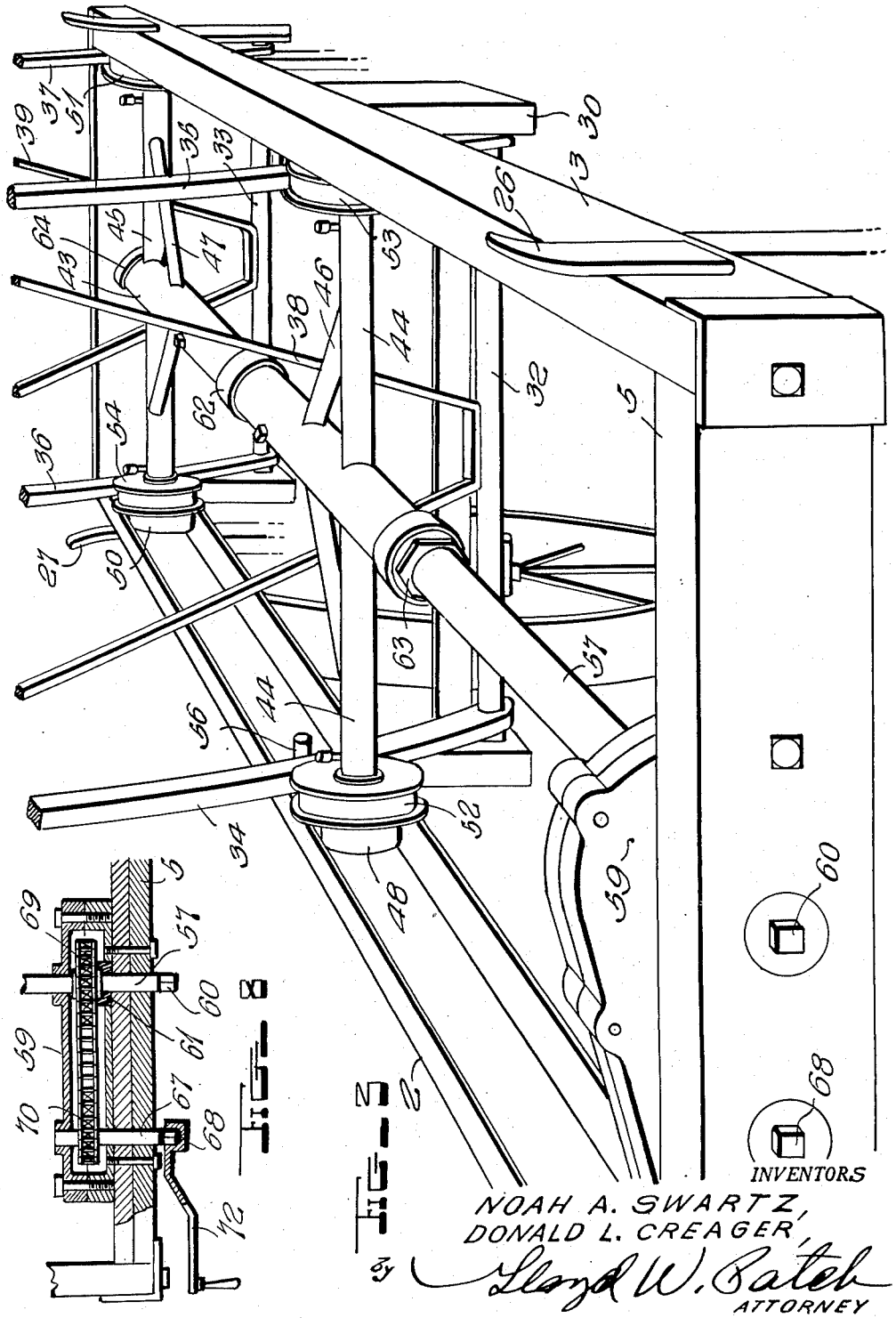

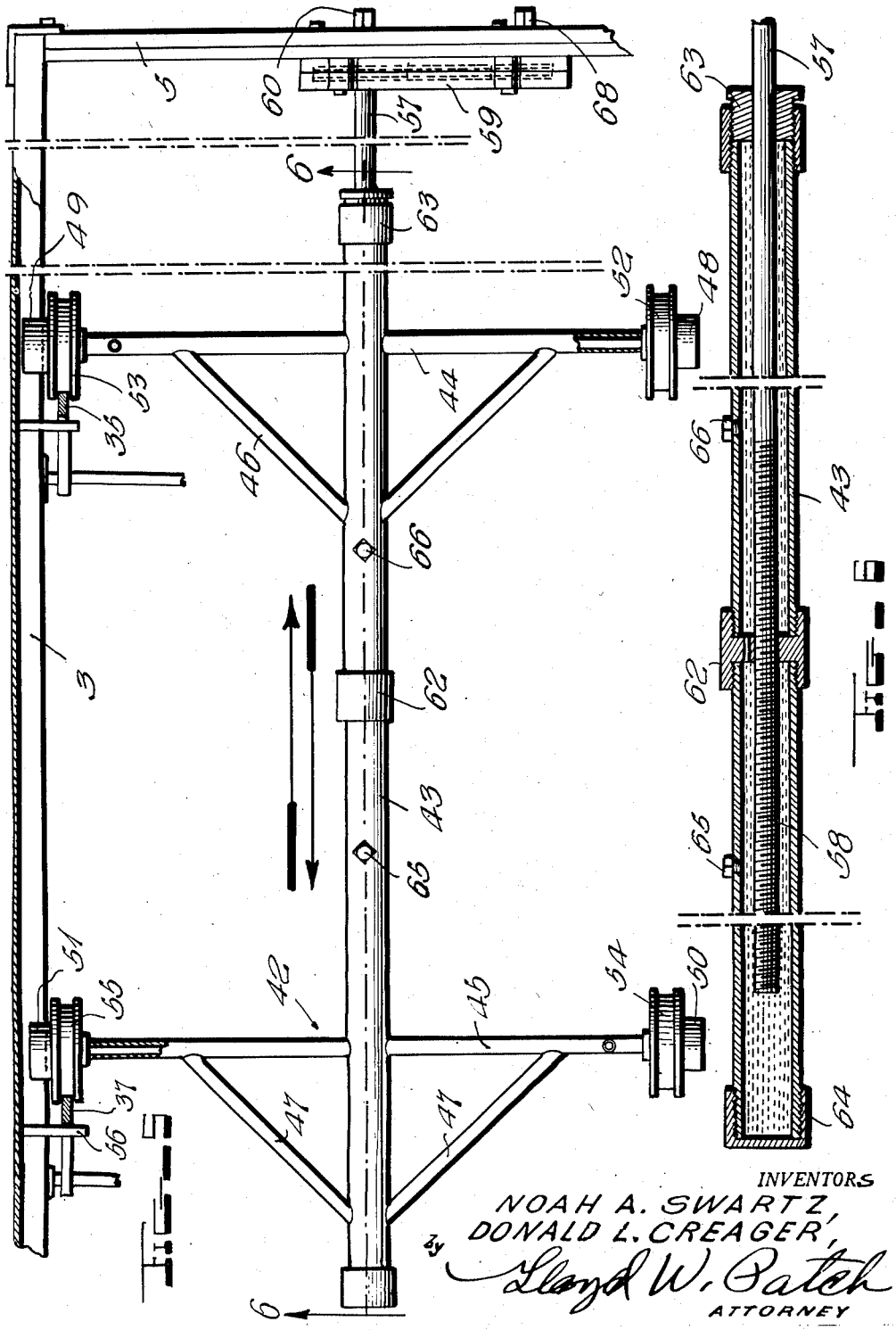

2,627,389

UNITED STATES PATENT OFFICE 2,627,389

LIFTING DEVICE FOR TRUCKS AND VEHICLES

Noah A. Swartz and Donald L. Creager, Pueblo, Colo.

Application March 11, 1948, Serial No. 14,254

5 Claims. (Cl. 254—10)

This invention relates to improvements in lifting devices for trucks and vehicles, and more particularly to structure of this character intended and adapted for embodiment upon and in connection with railway baggage and express trucks or wagons, or other vehicles, as used in railway terminals and in other places and connections where it is desired to provide a truck or wagon or vehicle with means for ready and rapid and easy elevation of articles and materials and loads carried by the truck or wagon or vehicle.

An object of our invention is to provide a lifting and handling device constructed or installed upon a truck or other vehicle, of such nature and character that caskets, safes, boxes, large bundles or packages, and other heavy and cumbersome articles and materials, not readily handled and lifted by manual labor, can be quickly and easily lifted from and lowered upon a truck and can be moved to an elevation and a position to be readily loaded into and unloaded from a car or other structure, or can be moved on to or from a car platform or warehouse floor or other structure at an elevation different from the normal elevation of the top of the truck.

Another object is to provide a structure as above set forth, in which the arrangement and construction and mounting of the several parts will be such as to allow the most efficient and rapid operation of the device and the parts, at the same time maintaining complete and absolute manual control of the mechanism at all times, thus insuring a maximum saving of time and a minimum probability or possibility of accidental injury to operating personnel or damage to articles handled.

A further object is to so construct and arrange and mount the parts in conjunction with the truck or vehicle, that heavy loads can be lifted and handled with the same facility as lighter loads and that when the load is lighter the operation can be quickened, thus readily adapting the device for easy and expeditious handling of anything that has to be loaded into and unloaded from express, baggage, mail, freight, or other cars or vehicles, whereby operations of loading and unloading will be expedited and loss of time causing delays and possible disruption of train schedules will be avoided.

Still another purpose of our invention is to provide structure of the character described including in addition to the lifting means, means for moving the load longitudinally on the truck, so that the load supporting and lifting portion can be advanced to a loading position closely adjacent to or substantially abutting against the outer sill of a car or platform, and can be retracted from the loading position to give free clearance when the lifting means is to be lowered.

Still another purpose is to provide structure of the above character which has the parts thereof so constructed, arranged and mounted, that most efficient operation of the parts is accomplished, and that the mechanism is at all times under complete and perfect manual control to thus maintain the highest efficiency in use and obviate or minimize the possibility of accidents.

With the above and other objects in view, some of which will be apparent to those skilled in the art, and others of which are inherent in the construction and operation and use of the parts, our invention includes certain novel features of construction and combinations of parts which will be hereinafter set forth in connection with the drawings, and then pointed out in the claims.

In the drawings:

Figure 1 is a view in side elevation showing a baggage truck in which our invention has been embodied.

Fig. 2 is a perspective view of the baggage truck as disclosed in Figure 1, showing the supporting platform in the raised or elevated position.

Fig. 3 is an enlarged fragmentary perspective view to better show the supporting frame and the lifting frame, the parts being here illustrated in the raised or elevated position.

Fig. 4 is an enlarged fragmentary vertical cross-sectional view of a part of the elevating mechanism.

Fig. 5 is a fragmentary sectional view on a horizontal plane to better show the mounting of the elevating mechanism on the supporting frame.

Fig. 6 is a longitudinal sectional view substantially on the line 6—6 of Fig. 5.

Fig. 7 is a fragmentary view in side elevation and partly in section showing in greater detail the tongue and brake mechanism by which the baggage truck is moved from place to place and is held against rolling or movement when brought to the desired position.

Fig. 8 is a fragmentary sectional view of the gear case and gears capable of use with our invention.

With our invention the supporting frame 1 is made up to be a substantially elongated rectangle when viewed in plan, and this supporting frame is of such size and dimensions as required for the type of baggage and express wagons or trucks as now ordinarily used, or can be made in any other desired and suitable size for the particular vehicle. The supporting frame 1 is preferably made up of suitable lengths of channel iron, the side bars or members 2 and 3 being disposed in spaced apart relation with the channel formations disposed inwardly, and being connected by the end members 4 and 5.

The side members and the end members can be connected together in any suitable manner, as by bolting, riveting, welding, or the like, and a substantial and rigid frame is thus provided, this supporting frame having the open channels of the side members 2 and 3 presented as substantially parallel and spaced apart trackways, for uses and purposes which will be hereinafter more fully set forth.

Near the forward end of the supporting frame, and preferably spaced somewhat inwardly from the transverse end member 5, supporting stanchions 6 and 7 depend downwardly from the side bars or members 2 and 3, and these supporting stanchions are connected at their lower end with the upper part of a fifth wheel structure. The lower part 9 of the fifth wheel structure is turnably connected with the upper part 8, and a steering or front axle 10 is mounted transversely with respect to the lower part 9 of the fifth wheel structure. Truck carrying and steering wheels 11 and 12 are mounted on this axle 10 to serve as the front wheels of the truck.

Depending axle mounting stanchions 13 and 14 are provided on the side bars or members 2 and 3 adjacent to and spaced inwardly from the cross bar or member 4, and these depending stanchions 13 and 14 have the rear axle 15 suitably mounted thereon. Truck supporting and carrying wheels 16 and 17 are mounted on this axle 15.

A tongue 18 extends forwardly from the lower part 9 of the fifth wheel structure, and a swingable tongue member 19 is connected on this tongue member 18. A handle 20, of any suitable and convenient type and construction, is provided on the outer end of the tongue member 19.

With the parts constructed and arranged and mounted in the manner set forth, the supporting frame 1 of the truck is mounted and carried for traveling movement by and on the wheels 11, 12, 16 and 17, and through the medium of the tongue structure and the handle 20, one or more persons can readily move and steer the wheeled truck structure over a platform or roadway or floor, or in any other place of use. While we have referred to front and rear axles, it will be appreciated that this truck structure can be pulled or pushed, and consequently these terms and the related description will be understood as being only relative terms. It is perhaps preferable that the several stanchions be of sufficient length to mount and carry the supporting frame 1 slightly above the upper rim portion of the several wheels, but this height will of course be calculated and regulated to correspond with the relative height of car or truck or platform floors, or other surfaces where it may be desired to load and unload articles and materials by the use of our improved truck. As the end portions of the supporting frame 1 extend somewhat over and beyond the axles, the carrying wheels will not ordinarily interfere with movement to and placement of our improved truck in any desired position for use.

A lifting frame 21, which is made up of side bars 22 and 23, and end members 24 and 25, is substantially rectangular when viewed in plan, and this lifting frame 21 is of such dimensions and shape that it will substantially fit and rest upon the supporting frame 1. Retaining stanchions 26 are provided on opposite sides of the forward portion of the supporting frame 1, and similar retaining stanchions are provided on opposite sides, at 27, near the rear of the supporting frame 1. Thus, when the lifting frame 21 is lowered or positioned to rest upon the supporting frame 1, these stanchions 26 and 27 will hold the lifting frame against lateral shifting or displacement. In the present instance, we have shown the lifting platform 21 as provided with a load supporting floor 28, and have disclosed a forward end rack at 29.

Bearing hangers 30 are provided on each side near the middle portion of the side members 2 and 3 of the supporting frame 1, and similar bearing hangers 31 are provided adjacent to the rear end of the side members 2 and 3. These several bearing hangers are thus mounted in depending relation on opposite sides of the supporting frame, and with their bearing ends depending downwardly, and supporting shaft members 32 and 33 are connected in the bearing opening of each pair of bearing hangers, as perhaps best illustrated in Fig. 2 of the drawings.

Arcuate link-like lifting arms 34 and 35 are connected on opposite sides with the supporting shaft 32, and other arcuate link-like lifting arms 36 and 37 are connected on the supporting shaft 33. A side stabilizing brace 38 connected in the middle portion of the supporting shaft 32 has its ends extending outwardly substantially diagonally and connected with the lifting arms 34 and 35, thus giving substantially rigid bracing to prevent side sway of these lifting arms 34 and 35. A similar side stabilizing brace 39 is connected with the arcuate lifting arms 36 and 37, and with the shaft 33, so that a substantially rigid arrangement is provided for these arcuate links 36 and 37. The free swinging ends of the lifting arms or arcuate links 34 and 35 are pivotally connected with the side bars 22 and 23, as at 40, somewhat toward the forward end of the lifting frame 21, and the arcuate link-like lifting arms 36 and 37 have pivotal connection with the side bars 22 and 23 of the lifting frame 21, as at 41, this pivotal connection being somewhat forward of the rear end of the lifting frame 21.

With the parts connected and assembled in the manner as described, the lifting frame 21 can be lowered to rest upon the supporting frame 1, and the retaining stanchions 26 and 27 will hold the lifting frame in the desired position. When the lifting rack or frame 21 is in this position, the several arcuate link-like lifting arms are swung down to lie substantially between the side members 2 and 3 of the supporting frame, and when the lifting frame 21 is elevated, these arcuate link-like lifting arms will swing upwardly and rearwardly to move the lifting frame 21 substantially rearwardly, after the manner shown in Fig. 2.

A lift actuating carriage 42 has an elongated central tubular member 43, and carriage axles 44 and 45 extend laterally therefrom adjacent to the ends of the central tubular member, radius braces being provided at 46 and 47 to connect the parts together as a substantially rigid lift actuating carriage. Track wheels 48 and 49 are mounted on the opposite ends of axle 44 and are of a size and disposition to travel within the inner channels of side members 2 and 3 of the supporting frame 1; and, similar track wheels 50 and 51 are provided on the axle 45 to travel and fit in similar manner. Flanged trunnion wheels 52 and 53 are provided on the carriage axle 44 to engage the outer sides of the pivoted arcuate link-like lifting arms 44 and 45; and other flanged trunnion wheels 54 and 55 are carried on carriage axle 45 in position to engage the curved outer side of the other arcuate link-like lifting arms 36 and 37. As illustrated in Figure 1 of the drawings, the several arcuate link-like lifting arms have a gradual curve, and as the lift actuating carriage 42 is moved rearwardly, or toward the left hand as the parts are illustrated in Fig. 5, the flanged trunnion wheels will exert force against the curved outer sides of these arcuate link-like lifting arms, and by reason of the gradual curve will maintain the same amount of energy required from the start to the finish of the lift. The full lift position is illustrated in Fig. 2 of the drawings, and when the parts are in this position further swinging movement of the several arcuate link-like lifting arms is prevented by stops 56, so that these lifting arms can not travel beyond dead center, or in other words to a position where they would not be supported upon and by the flanged trunnion wheels.

A screw shaft 57 has a screw threaded portion 58 received loosely within the central tubular member 43, and the outer end of this screw shaft 57 extends through a gear casing 59, and preferably with its outer squared or polygonal end 60 extending through an opening in the end member 5 of the supporting frame 1. A thrust bearing is provided at 61 to reduce friction and to prevent outward endwise movement of the screw shaft 57. As stated, the screw threaded portion 58 of the screw shaft 57 is received and housed within the central tubular member 43, and internally threaded nut portion 62 is mounted substantially in the middle of this central tubular member 43 with the threads thereof in mesh with the threads of the threaded portion 58. It is perhaps preferable that the threaded end 58 of the screw shaft 57, and the nut portion 62, be provided with a coarse square thread, as this will give the necessary strength and the desired feed of action or movement of the lift actuating carriage when the screw shaft 57 is rotated.

It is preferable that the screw threaded end 58 and the nut portion 62 be constantly lubricated; and to this end we provide a packing gland at 63, at the inner end of the central tubular member 43 and around the plain portion of the screw shaft, and a closing cap 64 at the outer end of the central tubular member. Grease or lubricant plugs 65 and 66 can be provided in the central tubular member 43, or any suitable lubricant fitting can be applied thereto.

A gear shaft 67 is mounted revolubly through the gear box or casing 59, spaced from the mounting of the screw shaft 57, and this gear shaft 67 has a squared or polygonal end 68 presented on the forward side of the cross or end member 5. Two to one ratio sprockets 69 and 70 are mounted on the screw shaft 57 and the gear shaft 67, within gear casing 59, and a roller chain 71 runs over these sprockets. An operating crank handle 72 is provided with a socket to receive the squared or polygonal end 60 and 68 of either screw shaft 57 or gear shaft 67. By applying the operating crank handle 72 directly to the squared or polygonal end of screw shaft 57, it is possible to accomplish a direct rotational movement of this screw shaft, with consequent direct drive or movement of lift actuating carriage 42, through the nut portion 62. Thus, lift actuating carriage 42 can be moved inwardly and outwardly, or in either direction along the axial line of screw shaft 57. When operating crank handle 72 is applied to the squared or polygonal end 68 of gear shaft 67, a two to one gear ratio is interposed, and the power applied to rotate screw shaft 57, in either direction, is correspondingly increased.

It is desirable that means be provided to hold the truck against accidental or casual movement, in any position to which it may be placed for use; and, in the present instance we have illustrated brake mechanism operatively associated with and actuated by the swingable tongue member 19. A brake beam 73 is disposed transversely in position to be engaged with the outer tread surfaces of the front wheels 11 and 12, and a brake draw bar 74 extends forwardly from the brake beam. The brake draw bar 74 extends forwardly and is slidably received through a supporting stirrup 75 carried by the tongue 18. The swingable tongue member 19 has a brake operating lever extension 76 thereon, and the brake draw bar 74 is pivotally connected with this brake operating lever extension, as at 77. A latch member 78 on the tongue 18 is positioned to be engaged by a latch link 79 swingably carried by the swingable tongue member 19, and a latch release chain is provided at 80. With this arrangement of the parts, the handle portion 20 of tongue 19 can be grasped by the operator and this handle can be used to push and pull and steer the truck to move and bring the truck to the desired position for use. Then, the tongue member 19 can be swung up to the position illustrated in Fig. 2, and the latch link 79 will engage with the latch member 78 to hold the tongue in this raised position where it will be out of the way. This same swinging movement of the swingable tongue member 19 swings the brake operating lever extension 76 to exert pulling force on draw bar 74 and consequently move brake beam 73 into a position where the brake beam 73 engages tightly with the rim surfaces of the wheels 11 and 12; and, in this way the brake is applied so that the truck will be positively held and maintained in the desired position and against accidental or casual movement. When it is desired to release the brake, release chain 80 can be pulled to lift latch link 79, and the swingable tongue member 19 can then be lowered to move brake beam 73 out of contact with the wheels.

With the embodiment of our invention as hereinbefore described in connection with the drawings, and with the lifting frame lowered as illustrated in Figure 1, chain 80 will be pulled to release the latch and the swingable tongue member 19 can then be swung down to a position where the handle 20 can be conveniently grasped for moving the truck. This same swinging of the tongue member 19 will release the brake, and the truck can then be readily and conveniently pushed and pulled and steered to the desired position for use. When the truck is in place, the swingable tongue member 19 is again raised and the brake is again applied to the wheels 11 and 12. The user or operator can then apply the operating crank handle 72 to either the end 60 or the end 68, and screw shaft 57 can be rotated either directly or at increased ratio. The operating crank handle 72 is then turned to rotate screw shaft 57 so that the nut portion 62 will be moved rearwardly or away from the operator, and as this nut portion 62 travels along the screw threaded portion 58 of screw shaft 57, the lift actuating carriage 42 will be correspondingly moved. The track wheels 48, 49, 50 and 51 hold the lift actuating carriage 42 to a definite path of movement, and support the same from the side bars or members 2 and 3 of the supporting frame 1; and, the flanged trunnion wheels 52, 53, 54 and 55 engaging with the arcuate link like lifting arms 34, 35, 36 and 37 will cause these arms to be swung upwardly to the position shown in Fig. 2 of the drawings. Of course, the lifting frame 21 can be lifted or elevated to any desired height or elevation, and the parts will serve to retain this elevation and to hold against accidental or casual lowering of the platform 21.

As lifting platform 21 is elevated, it is also swung or extended rearwardly beyond or outwardly over the end of the supporting frame 1, and this is quite advantageous as it is thus possible to bring the top of the lifting frame 21 into better registry with a platform or freight car or baggage car, or truck, or other floor or suface from or to which material is to be unloaded or loaded. Of course, if upon elevation of the lifting platform it is found that the truck structure is not properly placed, the brake can be released and the truck can be moved, following which the brakes are preferably set to retain the truck in place.

When it is desired to lower lifting platform 21, the operating crank handle 72 is turned in an opposite direction, and as the nut portion 62 is again drawn back on to the screw threaded portion 58 of the screw shaft 57, lift actuating carriage 42 will be moved forwardly with the trunnion wheels thereof supporting the arcuate lifting arms and permitting downward swinging movement thereof to accomplish lowering of lifting platform 21. It will of course be understood that this lowering movement can be accomplished by direct manipulation of screw shaft 57, or at a varied ratio through the sprocket arrangement. Also, it will be understood that while we have shown sprocket and chain gearing, other forms of increased or decreased ratio gearing or movement transmissions can be employed.

If desired, provision may be made to operate the parts raising and lowering the lifting frame, by power, such as electric motor, hydraulic power, compressed air, or engine power, and in fact any power means applicable for the purpose and under the conditions of use. Further, while we have illustrated and have described the truck mechanism as being pulled or pushed and guided by hand, it is to be understood that the truck can be power driven, through any suitable power means, or source of power, many adaptations of which are well known and will be understood by those skilled in the art.

While we have herein shown and described only certain specific embodiments of our invention and certain possible means and manners of associating and operating the parts, it will be appreciated that many changes and variations can be made in the form, construction, and arrangement of the parts, and in the manner of using and operating the various portions, without departing from the spirit and scope of our invention.

We claim:

1. A lifting device for trucks comprising, with a truck having a rectangular supporting frame, a rectangular lifting frame, arcuate swinging links swingably connected at their opposite ends between the frames and mounting said lifting frame on said supporting frame for elevating movement, a rectangular wheel carrying frame endwise movably mounted on said supporting frame, wheels on said wheel carrying frame engaging with the bowed out edge of each of said arcuate links, and means to move said wheel carrying frame endwise with the wheels engaging and swinging the arcuate links.

2. A lifting device for trucks comprising, with a truck having an elongated substantially rectangular supporting frame, an elongated substantially rectangular lifting frame, arcuate swinging links swingably connected at their opposite ends between the frames and mounting said lifting frame on said supporting frame for elevating movement, a rectangular wheel carrying frame endwise movably mounted in a plane substantially coinciding with and having endwise movement with respect to said supporting frame, wheels on said wheel carrying frame engaging with the bowed out edge of each of said arcuate links, a screw shaft rotatably mounted on said supporting frame and extending axially with respect to the line of movement of said wheel carrying frame, a nut on the wheel carrying frame engaging with the threaded portion of said screw shaft, and means for rotating said screw shaft.

3. A lifting device for trucks comprising, with a truck having an elongated substantially rectangular supporting frame, an elongated substantially rectangular lifting frame, arcuate swinging links swingably connected at their ends between the frames and mounting said lifting frame on said supporting frame for elevating movement, a rectangular wheel carrying frame endwise movably mounted on said supporting frame, wheels on said wheel carrying frame engaging with the outwardly bowed edge of each of said arcuate links, a screw shaft rotatably mounted on said supporting frame and extending axially with respect to the line of movement of said wheel carrying frame, a nut on the wheel carrying frame engaging with the threaded portion of said screw shaft, and manually actuatable means for rotating said screw shaft directly and with increased leverage.

4. A lifting device for trucks comprising, with a truck having a wheel mounted and carried elongated substantially rectangular supporting frame provided with spaced-apart channeled side bars, an elongated substantially rectangular lifting frame arcuate swinging links connected swingably at their ends with the two frames and mounting said lifting frame on said supporting frame for lifting movement, a rectangular lift actuating carriage, wheels on said carriage traveling in the channels of the side bars, other wheels on the carriage engaging the bowed out outer sides of each of said arcuate links, and means for moving said lift actuating carriage along the side bars and holding the same in desired positions.

5. A lifting device for trucks comprising, with a truck having an elongated substantially rectangular wheel mounted and carried supporting frame provided with side bars, an elongated substantially rectangular lifting frame, arcuate swinging links swingably connected at their ends with and between said frames mounting said lifting frame on said supporting frame for elevating movement as said links are swung around by mounting on the supporting frame, a rectangular lift actuating carriage endwise movable along and between the side bars of the supporting frame, wheels on said lift actuating carriage engaging the bowed outer sides of said arcuate links, a screw shaft rotatably mounted on said supporting frame and extending parallel with the side bars, a nut on the lift actuating carriage engaging with the threaded portion of said screw shaft, and manually actuatable screw shaft rotating means.

NOAH A. SWARTZ.
DONALD L. CREAGER.

REFERENCES CITED

The following references are of record in the file of this patent:

UNITED STATES PATENTS

| Number | Name | Date |
| --- | --- | --- |
| 533,059 | Harthan | Jan. 29, 1895 |
| 1,257,169 | Yarbrough | Feb. 19, 1918 |
| 1,386,390 | Barker | Aug. 2, 1921 |
| 1,693,335 | Damerell | Nov. 27, 1928 |
| 1,830,740 | Leech et al. | Nov. 3, 1931 |
| 1,910,398 | Ludington | May 23, 1933 |
| 1,985,169 | Howell et al. | Dec. 18, 1934 |
| 2,023,184 | Watson, Jr. | Dec. 3, 1935 |
| 2,351,846 | Swim et al. | June 20, 1944 |
| 2,379,094 | Maxon, Jr. | June 26, 1945 |

FOREIGN PATENTS

| Number | Country | Date |
| --- | --- | --- |
| 30,130 | France | Dec. 3, 1925 |
| (Addition to No. 559,735) | | |